Sept. 26, 1933.  F. N. EATON  1,928,333
REVOLVING SIGN AND THE LIKE
Filed June 27, 1931   3 Sheets-Sheet 3

Inventor
Frederic North Eaton

Patented Sept. 26, 1933

1,928,333

UNITED STATES PATENT OFFICE 1,928,333

REVOLVING SIGN AND THE LIKE

Frederic North Eaton, Pasadena, Calif.

Application June 27, 1931. Serial No. 547,334

7 Claims. (Cl. 40—33)

My invention relates to revolving advertising signs, advertising boards, searchlights, beacon lights, or the like, and the objects of my invention are: First, to provide an inexpensive combination of bearings and a provisional means integral therewith for transmission of electrical current from stationary to revolving part for illuminating and other purposes; second, to provide this combination of bearings and electrical transmission means with a means of continuous lubrication and protection from the elements to assure maximum service with minimum attention; third, to provide a combination of bearings and structure without a vertical support shaft thereby eliminating weight, cost and erection of such a shaft which in large signs must necessarily be of heavy section; fourth to provide a self adjusting frictional driving means in combination with these bearings and this structure for revolving a sign which relieves driving unit of excess strain by slipping during severe wind or other interference with normal operation and provides for automatic takeup of wear; and fifth, to provide an optional means of adjacent or remote positioning of driving unit in respect to revolving part.

I attain these objects by the mechanism illustrated in the accompanying drawings in which—

In the following description similar numbers refer to similar parts in the several views.

Figure 1:
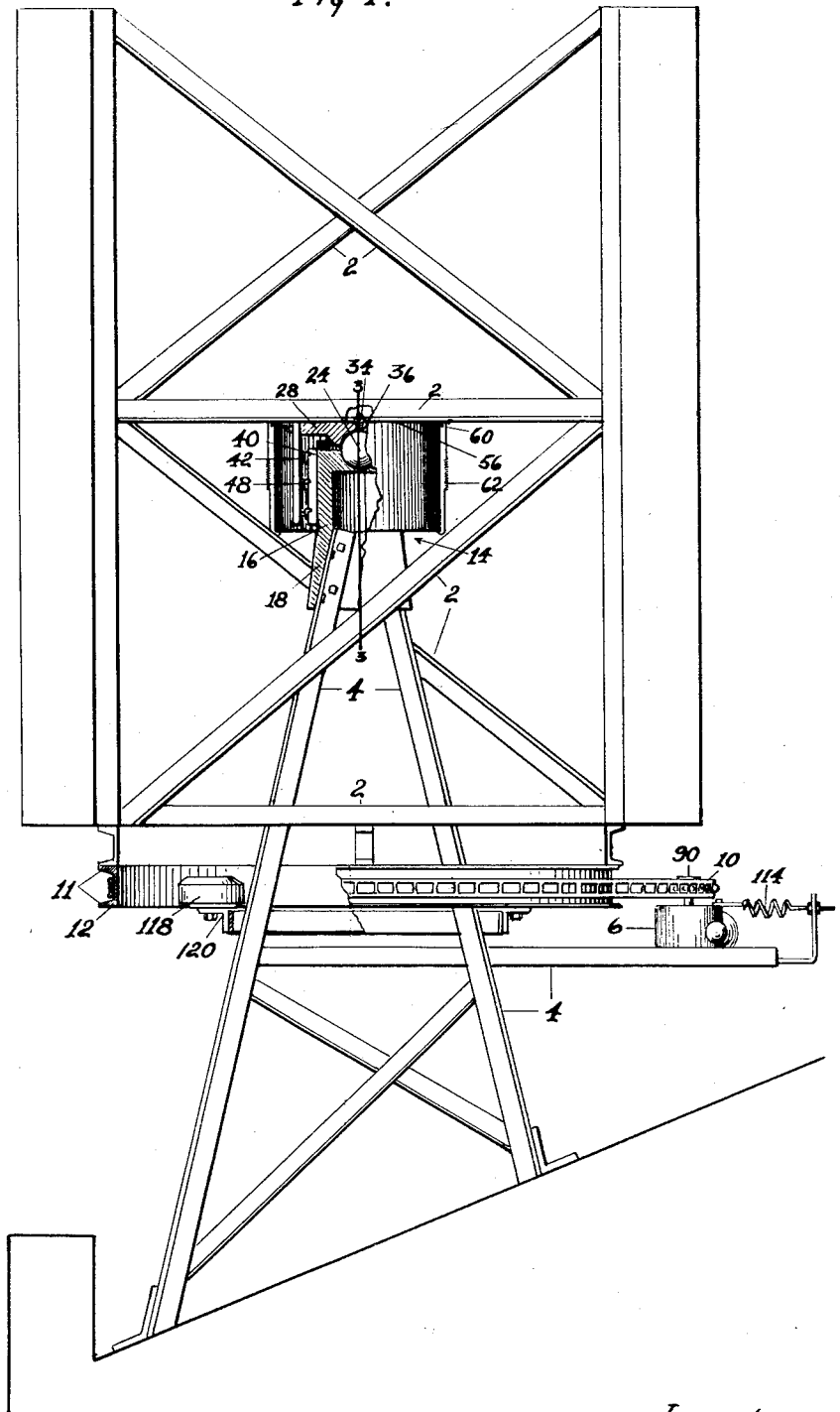
Fig. 1 is an end elevation of a revolving sign having driving unit adjacent to revolving part.
Figure 2:
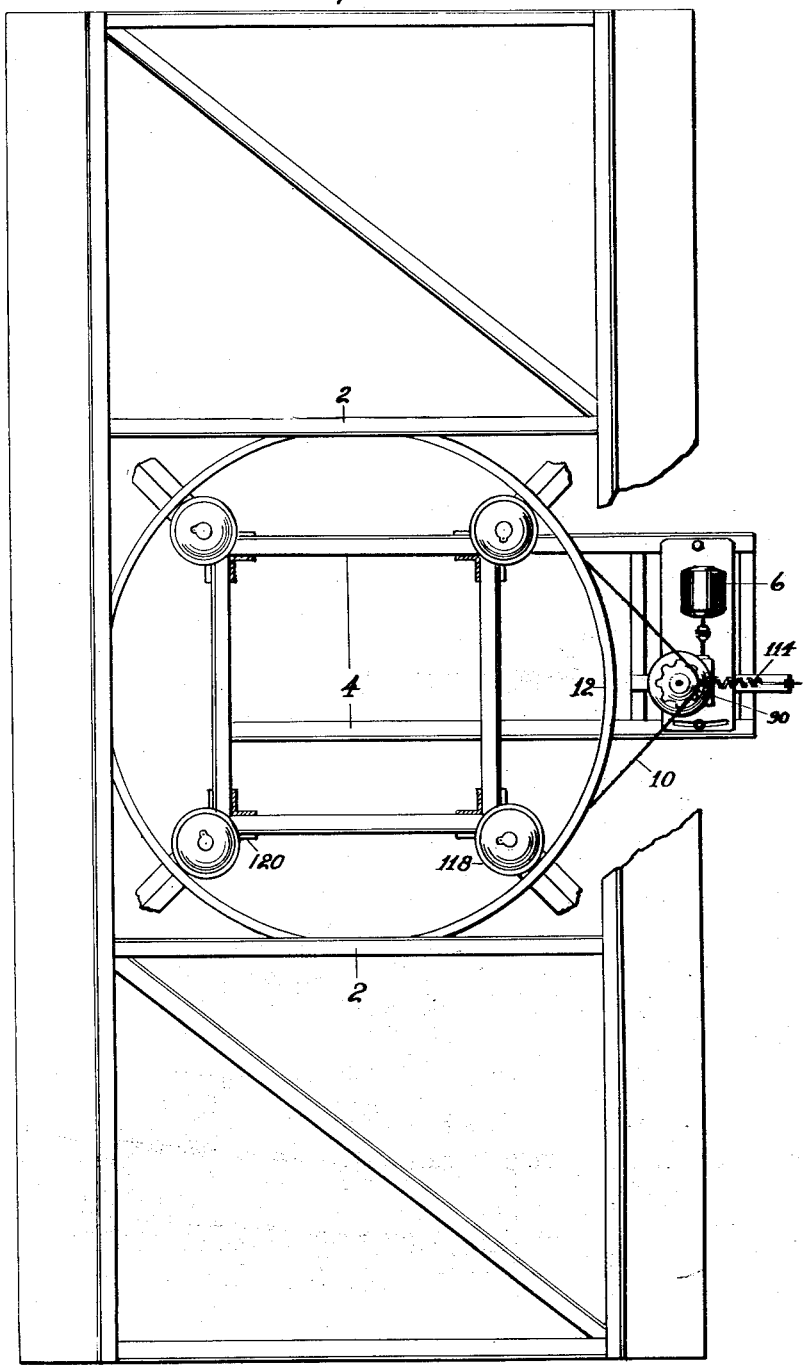
Fig. 2 is a plan view of mechanism taken from the level of bottom part of revolving part, a section of which has been removed to show arrangement of driving unit, sprocket, chain, driving and guiding ring, and guide rollers.
Figure 3:
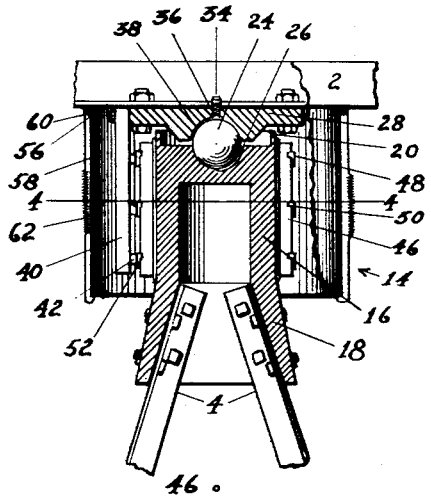
Fig. 3 is an enlarged cross section of the continuously lubricated pivotal bearing with protected electrical transmission means taken on the line 3 3 of Fig. 1.
Figure 5:
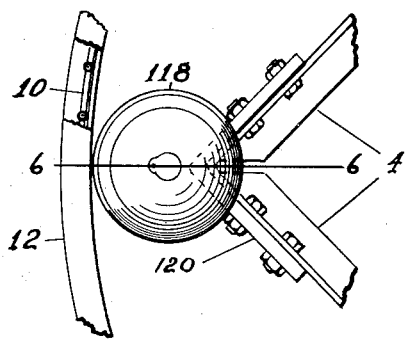
Fig. 5 is a plan view of a continuously lubricated guide roller and bracket, section of driving ring and chain, and mounting on stationary structure.
Figure 4:
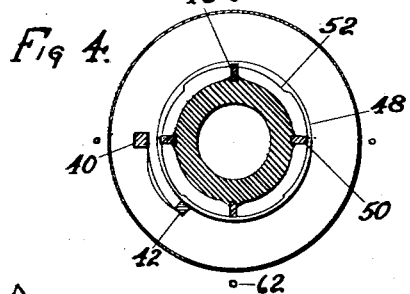
Fig. 4 is a transverse cross section taken on line 4 4 of Fig. 3.
Figure 6:
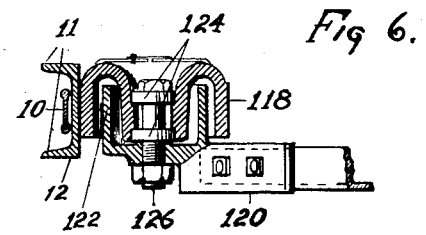
Fig. 6 is a vertical cross section taken on line 6 6 of Fig. 5.
Figure 7:
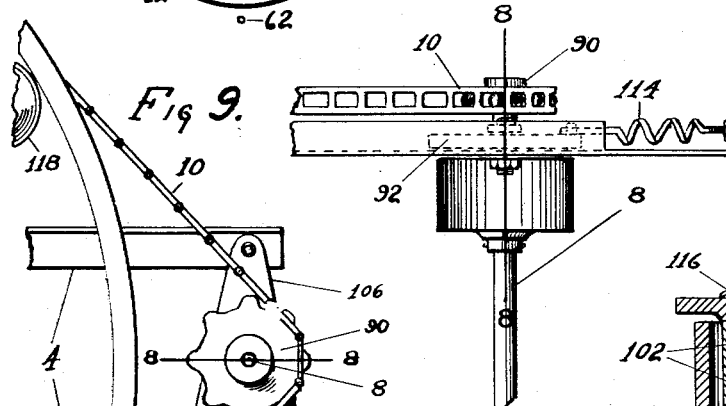
Fig. 7 is a side elevation of a remotely positioned driving unit with flexible drive shaft, continuously lubricated hinged bearing block, driving ring and chain.
Figures 8, 9:
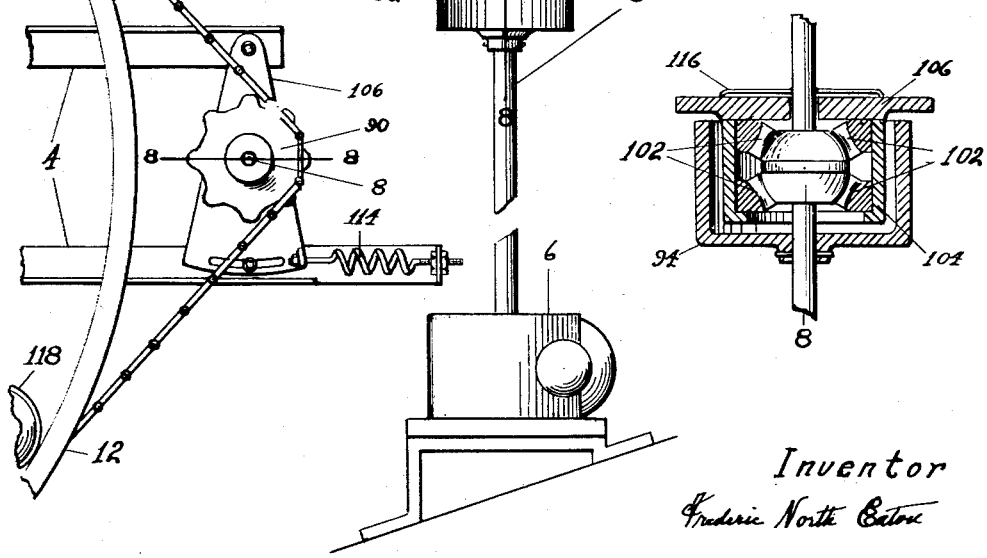
Fig. 8 is a vertical cross section of bearing taken on line 8 8 of Figs. 7 and 9.
Fig. 9 is a plan view of the hinged bearing block and self adjusting driving means showing section of driving ring and chain.

In a revolving sign or the like the revolving part 2 is supported on a pivotal bearing 14 mounted on a stationary structure 4 with which are substantially associated a plurality of continuously lubricated guide rollers 118, preferably four in number, by means of brackets 120 in such a manner that they bear outwardly against and rotate horizontally with the internal face of an annular ring 12, said ring being substantially associated with revolving part 2 and having an external flange 11 adapted to guide a chain 10 onto its external surface when driven by a sprocket 90 and driving unit 6, thus imparting a revolving motion to part 2 thru frictional contact with ring 12. Driving unit 6 is hingedly associated with structure 4 and has a self-adjusting spring means 114 to maintain tension on chain 10 sufficient for driving sign under ordinary conditions and providing slippage between said chain and said ring during severe wind or other interference with normal operation.

In a pivotal bearing 14, consisting of a top plate 28, a bottom part 16 having a plurality of extensions 18 or other suitable mounting means, and a ball 24 or other suitable bearing separating said plate and bottom part, I have provided a plug 34, a passage 36, a groove 38, by means of which oil may be supplied to a reservoir formed by an annular upwardly extending rib 20, thus providing continuous lubrication to bearing surfaces, and a groove 26 which forms a sump for retaining foreign matter which would have an abrasive action on bearing surfaces if allowed to circulate. For the purpose of transmitting electrical current from stationary part 4 to revolving part 2 for illuminating or other use, I have provided this bearing with one or more annular rings 48, each having a plurality of internal cams 52 whereby they can be substantially associated with said bearing by rotating slightly in notches 50 provided in the surfaces of a plurality of insulating bars 46 placed vertically between said rings and said bearing thus tightening said cams in contact with said notches in said bars, thereby producing sufficient tension in said rings to secure them in place. Current for illuminating or other use conducted to said rings by wires may be transmitted to revolving part 2 thru brushes 42 adjustably associated with plate 28 by means of insulating post 40 said brushes being in sliding contact with surface of said rings. To protect this bearing and electrical transmission means from the elements I have provided top plate 28 with a cover 56, placed between said top plate and revolving part 2, having a downwardly extending lip 60 adapted to receive an open-ended drum 58, retained in position by a plurality of tension springs 62, said springs and drum being easily lowered for inspection and adjustment of brushes.

To protect driving unit from damage due to severe winds or other interference with normal operation I have allowed for slippage under such conditions by providing a frictional means for revolving part 2 consisting of a chain 10, bearing and exerting frictional tractive effort on the external surface of ring 12 and retained thereon by an external flange 11 of said ring which may be of channel, angle or other suitable section, said chain being driven by a sprocket 90 and held in tension with said ring by a spring 114 adjustably associated with structure 4 and a hinged driving unit 6, said driving unit being either directly associated with sprocket 90 or remotely positioned at a lower level with respect thereto thru the medium of a flexible drive shaft 8 and a hinged bearing block 92 as desired. For remote positioning of driving unit shaft 8 may be supported near sprocket 90 by a hinged bearing block 92 consisting of a plate 106 having a downward extension 104 containing bearings 102 and a protecting cover 116 adapted to shaft 8, continuous lubrication for said bearing being provided by a reservoir consisting of a cup 94 substantially associated with said shaft and laterally surrounding extension 104 with clearance. Tension on driving chain is provided by a spring 114 in the same manner and for the same purpose as stated for direct drive.

To guide ring 12 and maintain equilibrium of revolving part I have provided a plurality of continuously lubricated guide rollers 118, preferably four in number, having a bracket 120 adapted to be substantially associated with structure 4, an axle 126 substantially associated with said bracket, an upwardly extending annular rib 122 forming an oil reservoir concentric with said axle, said roller having a downwardly opening annular groove adapted to receive said rib with clearance and a cover with oil hole and being adapted to rotate on antifriction bearings 124 in association with said axle.

I am aware that prior to my invention some of the devices and means herein described have been used for other purposes and that other types of revolving signs have been in existence. I therefore do not claim broadly the invention of these devices and means or revolving signs; but,

I claim:

1. The combination in a revolving sign, advertising display, searchlight, beacon light or the like as described of a continuously lubricated weatherproof pivotal bearing having a plurality of concentric electrical transmission rings frictionally secured thereto by means of internal cams and notched insulating bars, an insulating post supporting a plurality of electrical transmission brushes, a reservoir to maintain oil level around bearing surfaces and a sump to trap foreign abrasive matter; a plurality of weatherproof, continuously lubricated, horizontally rotating guide rollers adapted to be substantially associated with a stationary structure and bear radially against the internal surface of a driving and guiding ring, and having an annular groove and an annular rib in association for lubricating purposes; an annular driving and guiding ring adapted to be associated with revolving part having an external flange and driving surface adapted to receive a chain and be driven thereby and an internal surface adapted to be guided by rollers; a frictional chain driving means having a self adjusting tenson means adapted for adjacent or remote positioning of driving unit; and in the case of a remotely positioned driving unit a flexible driving shaft laterally supported by means of a continuously lubricated weatherproof radial bearing contained in a hinged laterally movable bearing block associated with a self adjusting tension means adapted to transmit driving power from a driving unit fixedly positioned at a lower level thru a sprocket to a frictional chain driving means as described.

2. The combination in a revolving sign or the like, of a pivotal bearing consisting of a top part adapted to support a revolving structure, a ball or other suitable bearing, and a bottom part adapted to be associated with a stationary structure with a means of transmitting electrical current to revolving part for illuminating or other purposes, said top part being adapted to support an insulating bar having a plurality of electrical transmission brushes mounted thereon and having a grooved bearing surface, an oil passage leading to said groove and a protecting cover having a downwardly extending lip adapted to receive a cylindrical protecting drum removably associated with said cover by a plurality of resilient tension means; and said bottom part having a bearing surface grooved to provide a sump for trapping foreign abrasive matter, an annular rib concentric with and extending above level of said bearing surfaces to provide an oil reservoir, and a plurality of vertical notches in its external surface adapted to receive insulating bars horizontally notched to receive the internal cams of a plurality of annular electrical transmission rings which may be substantially associated with said bottom part concentrically thru friction by a slight rotation of said rings causing tension in rings and thereby securing said cams in contact with said bars.

3. The combination in a revolving sign or the like of a plurality of weatherproof, continuously lubricated, horizontal guide rollers with a stationary structure and a driving and guiding ring adapted to bear radially against and guide the internal surface of said ring, said rollers mounted on a bracket individually, having an annular rib and an axle supporting a bearing concentric therewith extending upwardly from said bracket adapted to be substantially associated with said stationary structure, said bearing supporting a roller having a weatherproof cover with oil hole and a downwardly opening annular groove adapted to receive with clearance said rib thereby laterally surrounding said bearing and providing an oil reservoir in which said bearing is continuously immersed.

4. The combination in a revolving sign or the like of an externally flanged annular driving and guiding ring substantially associated with revolving part with a plurality of horizontal guide rollers substantially associated with stationary part and adapted to bear radially against and guide the internal surface of said ring.

5. The combination in a revolving sign or the like of a driving chain with an externally flanged annular driving and guiding ring substantially associated with revolving part and adapted to receive said chain on its external surface, retain it by means of said flange and to be driven by it by means of frictional contact.

6. The combination in a revolving sign or the like having a driving unit hingedly positioned at the same level and adjacent to an annular driving ring, of a chain driven by a sprocket associated with said driving unit with a means of maintaining tension in said chain consisting of a horizontally hinged driving unit, associated by an adjustable spring with a stationary bracket, said spring thereby exerting tension on said chain thus automatically compensating for chain wear, irregularity in shape or motion of said ring, and controlling and allowing slippage between said ring and said chain due to severe wind or other interference with normal operation thus protecting all mechanical parts from damage under such conditions.

7. The combination in a revolving sign or the like having a stationary driving unit and an annular driving and guiding ring positioned at different respective levels of a weatherproof, continuously lubricated, hinged bearing block with a flexible driving shaft and a spring tension means, said hinged bearing block consisting of a plate adapted to be horizontally hingedly associated with stationary structure, said plate having a downward extension containing anti-friction bearings adapted to support said shaft in a horizontal plane and a weatherproof cover with hole for said shaft; said shaft being adapted to transmit power from said driving unit to a sprocket and chain and having substantially associated therewith an oil reservoir cup adapted to receive with clearance said downward extension for lubrication purposes; and said tension means consisting of an adjustable spring in association with said bearing block and stationary structure for the purpose of maintaining tension in said chain.

FREDERIC NORTH EATON.